United States Patent
Ouellette et al.

(10) Patent No.: US 10,951,643 B2
(45) Date of Patent: Mar. 16, 2021

(54) SYSTEMS AND METHODS FOR DETECTING AND LOCATING UNSECURED SENSORS IN A NETWORK

(71) Applicant: Refinitiv US Organization LLC, New York, NY (US)

(72) Inventors: Corey Ouellette, Kitchener (CA); Amit Shavit, Boston, MA (US); Juanjie Joyce Shen, New York, NY (US); Jennifer Singh, Atlanta, GA (US)

(73) Assignee: Refinitiv US Organization LLC, New York, NY (US)

( * ) Notice: Subject to any disclaimer, the term of this patent is extended or adjusted under 35 U.S.C. 154(b) by 156 days.

(21) Appl. No.: 15/921,243

(22) Filed: Mar. 14, 2018

(65) Prior Publication Data

US 2018/0270267 A1 Sep. 20, 2018

Related U.S. Application Data

(60) Provisional application No. 62/471,383, filed on Mar. 15, 2017.

(51) Int. Cl.
*H04L 29/00* (2006.01)
*H04L 29/06* (2006.01)
(Continued)

(52) U.S. Cl.
CPC ........ *H04L 63/1433* (2013.01); *G06F 3/0481* (2013.01); *H04L 63/1425* (2013.01);
(Continued)

(58) Field of Classification Search
CPC . H04L 63/1433; H04L 63/1425; H04L 67/18; H04L 67/12; H04L 61/2007; G06F 3/0481; G06F 3/0482
See application file for complete search history.

(56) References Cited

U.S. PATENT DOCUMENTS 7,639,621 B1 * 12/2009 Larosa .................... H04L 12/66
370/241
7,925,982 B2 * 4/2011 Parker .................... G06F 16/29
715/748

(Continued)

FOREIGN PATENT DOCUMENTS

WO  2009079036 A1  6/2009

OTHER PUBLICATIONS

Lachlan Urquhart; Derek McAuley, "Avoiding the internet of insecure industrial things." Horizon Digital Economy Research Institute, University of Nottingham, Nottingham, United Kingdom; published online, Jan. 17, 2018. 17 pages. (Year: 2018).*

(Continued)

*Primary Examiner* — Don G Zhao
(74) *Attorney, Agent, or Firm* — McCarter & English, LLP

(57) ABSTRACT

A system, method and non-transitory computer readable medium for detecting unsecured sensors in a network. A computing system can find an IP address associated with an unsecured sensor based on a port through which the unsecured sensor communicates with the network. The computing system can ascertain a prefix route associated with the IP address for the unsecured sensor based on a portion of the IP address. The computing system can determine geographic coordinate data associated with the prefix route. The computing system can identify location data of a set of facilities within a specified geographic radius of the geographic coordinate data. The computing system can associate the unsecured sensor with a first one of the facilities in the set of facilities based on a distance between geographic coordinate data and the location data associated with the first one of the facilities being less than a specified distance threshold.

20 Claims, 18 Drawing Sheets

(51) Int. Cl.
*H04L 29/08* (2006.01)
*G06F 3/0481* (2013.01)
*G06F 3/0482* (2013.01)
*H04L 29/12* (2006.01)

(52) U.S. Cl.
CPC ............ *H04L 67/18* (2013.01); *G06F 3/0482* (2013.01); *H04L 61/2007* (2013.01); *H04L 67/12* (2013.01)

(56) References Cited

U.S. PATENT DOCUMENTS

| | | | | |
|---|---|---|---|---|
| 9,646,025 | B2* | 5/2017 | Boyns | H04L 67/306 |
| 9,792,330 | B1* | 10/2017 | Hawkins | G06F 16/24578 |
| 2007/0229350 | A1 | 10/2007 | Scalisi et al. | |
| 2008/0031241 | A1 | 2/2008 | Toebes et al. | |
| 2009/0031042 | A1* | 1/2009 | Phatak | H04L 61/1511 709/245 |
| 2009/0122797 | A1* | 5/2009 | Thubert | H04W 40/246 370/392 |
| 2009/0202112 | A1* | 8/2009 | Nielsen | G06K 9/0063 382/113 |
| 2010/0020942 | A1 | 1/2010 | Olshansky et al. | |
| 2010/0188245 | A1* | 7/2010 | Nielsen | G01V 3/08 340/686.1 |
| 2011/0029398 | A1 | 2/2011 | Boudville | |
| 2011/0046999 | A1* | 2/2011 | Nielsen | G06Q 10/063 705/7.39 |
| 2011/0191058 | A1* | 8/2011 | Nielsen | B65D 83/203 702/130 |
| 2012/0001754 | A1* | 1/2012 | Kraus | G08B 25/004 340/540 |
| 2012/0026890 | A1* | 2/2012 | Banka | H04L 67/125 370/242 |
| 2012/0026898 | A1* | 2/2012 | Sen | H04L 43/04 370/252 |
| 2012/0026938 | A1* | 2/2012 | Pandey | H04L 43/065 370/328 |
| 2013/0021946 | A1* | 1/2013 | Pan | H04W 60/00 370/254 |
| 2013/0203376 | A1* | 8/2013 | Maier | H04W 4/90 455/404.2 |
| 2013/0227641 | A1* | 8/2013 | White | H04L 63/20 726/1 |
| 2013/0268997 | A1* | 10/2013 | Clancy, III | G06F 21/53 726/1 |
| 2013/0311634 | A1* | 11/2013 | Raymond | H04L 67/12 709/223 |
| 2014/0075496 | A1 | 3/2014 | Prakash et al. | |
| 2014/0201807 | A1* | 7/2014 | White | G06F 21/53 726/1 |
| 2014/0280710 | A1* | 9/2014 | Wilson | H04L 61/256 709/217 |
| 2015/0026779 | A1 | 1/2015 | Ilsar et al. | |
| 2015/0096352 | A1 | 4/2015 | Peterson et al. | |
| 2015/0363563 | A1* | 12/2015 | Hallwachs | G06F 19/321 705/3 |
| 2016/0100362 | A1 | 4/2016 | Palanisamy et al. | |
| 2016/0157113 | A1* | 6/2016 | Row, II | H04W 84/18 370/252 |
| 2016/0163177 | A1* | 6/2016 | Klicpera | G08B 21/18 137/59 |
| 2016/0182574 | A1* | 6/2016 | Kim | H04L 65/102 709/227 |
| 2016/0381071 | A1* | 12/2016 | Tatourian | H04L 63/1425 726/23 |
| 2017/0024484 | A1* | 1/2017 | Qiu | H04L 67/14 |
| 2017/0109361 | A1* | 4/2017 | Shaw | H04M 15/09 |
| 2017/0155851 | A1* | 6/2017 | Van Laere | G01J 5/025 |
| 2017/0180386 | A1 | 6/2017 | Dewan et al. | |
| 2017/0235454 | A1* | 8/2017 | Selfridge | G06F 3/0484 715/744 |
| 2017/0244726 | A1* | 8/2017 | Finkel | H04L 63/123 |
| 2017/0366462 | A1* | 12/2017 | Soelberg | H04L 47/28 |
| 2018/0018867 | A1* | 1/2018 | Locke | G06K 9/00671 |
| 2018/0026942 | A1* | 1/2018 | De Ligt | G05B 19/41855 709/245 |
| 2018/0129493 | A1* | 5/2018 | Deixler | H04L 12/2814 |
| 2018/0177395 | A1* | 6/2018 | Kawazu | A61B 5/00 |
| 2018/0249299 | A1* | 8/2018 | Mevissen | H04L 67/306 |
| 2018/0293387 | A1* | 10/2018 | Bar-El | G06F 21/575 |
| 2019/0007503 | A1* | 1/2019 | Zmijewski | H04L 43/0864 |
| 2019/0311120 | A1* | 10/2019 | Jaenisch | H04L 63/1408 |
| 2019/0387198 | A1* | 12/2019 | Mazzarella | H04N 5/772 |

OTHER PUBLICATIONS

International Search Report and Written Opinion from related International Patent Application No. PCT/US2018/02242, dated Jun. 11, 2018.
Extended European Search Report from related European Patent Application No. 18767327.2 dated Nov. 5, 2020.
Francois, Jerome et al., Optimizing Internet Scanning for Assessing Industrial Systems Exposure, International Wireless Communication and Mobile Computing Conference, vol. 42, Sep. 5, 2016, pp. 516-522.
Muir, James, et al., Internet Geolocation: Evasion and Counterevasion, ACM Compiutinjg Surveys, vol. 42, No. 1 Article 4, Dec. 2009.
Examiner's Report from related Canadian Patent Application No. 3,055,626 dated Nov. 18, 2020.

* cited by examiner

\*Can get a list of IPs from Shodan:\*

```
```
list of ips =
['186.65.82.62',
 '155.254.35.48',
 '173.255.220.187',                              ←———— 502
 '101.80.180.242',
 '162.13.31.156',
 '54.172.118.71',
 '80.96.177.217']
```
```

\*Example `JSON` output from Shodan for a given IP:\*

```
```
{'_shodan': {'crawler': 'e9392a930ba74a5a7a9a04c307d8f2d045dad4b4',
  'id': None,
  'module': 'ftp',
  'options': {}},
 'asn': 'AS6830',
 'data': '220 Welcome to General Electric Ftp Server!Please Login!\r\n530 Permission denied.\r\n530 Please login with USER and PASS.\r\n211-Features:\n EPRT\n EPSV\n MDTM\n PASV\n REST STREAM\n SIZE\n TVFS\n UTF8\n211 End',
 'domains': ['phn.ro'],
 'hash': 976550728,
 'hostnames': ['phn.ro'],
 'ip': 1348514265,
 'ip_str': '80.96.177.217',
 'isp': 'Institutul National de Cercetare-Dezvoltare in inf',
 'location': {'area_code': None,
  'city': None,
  'country_code': 'RO',                          ←————504
  'country_code3': 'ROU',
  'country_name': 'Romania',
  'dma_code': None,
  'latitude': 46.0,
  'longitude': 25.0,
  'postal_code': None,
  'region_code': None},
 'org': 'Institutul National de Cercetare-Dezvoltare in inf',
 'os': None,
 'port': 21,
 'timestamp': '2017-02-13T08:42:06.512664',
 'transport': 'tcp'}
```
```

FIG. 5A

```
 ```
{'110': {'pop3': {'ssl_2': {'export': False,
    'extra_clear': False,
    'metadata': {},
    'support': False},
   'starttls': {'banner': '+OK Genel Mail Server Ready.',
    'metadata': {},
    'starttls': '+OK Begin TLS negotiation now.',
    'tls': {'certificate': {'parsed': {'extensions': {'authority_key_id':
'44421c59b6722e31f63a936893236150759d5317',
       'basic_constraints': {'is_ca': True},
       'certificate_policies': [],
       'subject_key_id': '44421c59b6722e31f63a936893236150759d5317'},
      'fingerprint_md5': '5c197bb187b0b27f4066643fbd128d38',
      'fingerprint_sha1': '5b6a82e824fa34c7b0515b1c1aad5aeba7c9eb32',
      'fingerprint_sha256': 'ee713fe624087575b4da5b2822d18b2710a867b384aa28290cc22562a58e5786',
      'issuer': {'common_name': ['relay.phn.lan'],
       'organization': ['Dovecot mail server'],
       'organizational_unit': ['relay.phn.lan']},
      'issuer_dn': 'O=Dovecot mail server, OU=relay.phn.lan, CN=relay.phn.lan,
emailAddress=root@relay.general-electric.ro',
      'names': ['relay.phn.lan'],
      'redacted': False,
      'serial_number': '10638164172791150670',
      'signature': {'self_signed': True,
       'signature_algorithm': {'name': 'SHA1WithRSA',
        'oid': '1.2.840.113549.1.1.5'},
       'valid': True,
       'value':
'qrsgFBjLrfW6Rx2g1UYuasOjIlCXCkwcisBRJU7A9JiDEF5x3DHQ/0tMnpXnh0wq9pSWVOSg6khapD/5ZuPF1HPTlfoSr9wYEFHG
Pz/0zq4Jq+tzgGRes9TUWq2jB+Pnafnhp+7aq4TqK+7+pVf89789BAJCGGmcSoAyYv+UHdAOZohNAY9zKFL9NVHUUyx/+490h+yn3
eS4iVbFkIncg2itO0997WlTrQx90HwZanFdbCk8vXUZIKpgnx7zq1tFJDFFILpXKqoeIYuCIi19/s2cMXWWzhwd9P3j/NSwbCbHNN
PgN7tGs7BkjFseCDtU74Vrr3GD+GnTzBxYczKpGQ=='},
      'signature_algorithm': {'name': 'SHA1WithRSA',
       'oid': '1.2.840.113549.1.1.5'},
      'spki_subject_fingerprint':
'39b432ed13464d541b33ec4f78694c38786e7bd08216f272cda67a475cf5d8f5',
      'subject': {'common_name': ['relay.phn.lan'],
       'organization': ['Dovecot mail server'],
       'organizational_unit': ['relay.phn.lan']},
      'subject_dn': 'O=Dovecot mail server, OU=relay.phn.lan, CN=relay.phn.lan,
emailAddress=root@relay.general-electric.ro',
      'subject_key_info': {'fingerprint_sha256':
'814b501699fff67cbd282ec06406ffffda3080abb16d68320d6714dffb22976c',
       'key_algorithm': {'name': 'RSA'},
       'rsa_public_key': {'exponent': 65537,
        'length': 2048,
        'modulus':
'zQqeJwBv8MgmkgO2H41Sq5O206YUGtps0WwzCbUkoHagi8348deOLCG5NkIydWk7DOC7eXWcVYVrTnqsz4cg7wuGjGfBUylCPyVH
AEXBOTDgKgv7mgGtqPISa/USR/qHhXE01UmGsAthu9oYq4ixyY1pi7JehWE+jGKXWKaBDkixXis2D9u3auf+WK+7e0z+MZjfVBUyw
K0PyqbdZu6S3dq0HCHrOCUd7I5VMr69noOwrDRiaAvgYnGFwgSwnvJbD2UYBUPEOIjnMdJy2yTeSdNiPmhu8fFAfLXKK5ouD7Wkq5
FDWBvFDW41eTa6D2OaY7Q0IiflPGcR9O1BIWtcew=='}},
      'tbs_fingerprint': 'c1df1075dd61b1f0dc237037f79522fb006546308005f1ff255790a19f49338a',
      'tbs_noct_fingerprint': 'c1df1075dd61b1f0dc237037f79522fb006546308005f1ff255790a19f49338a',
      'validation_level': 'DV',
      'validity': {'end': '2023-08-29T12:03:02Z',
       'length': 315532800,
       'start': '2013-08-29T12:03:02Z'},
      'version': 3}},
    'cipher_suite': {'id': '0xC02F',
     'name': 'TLS_ECDHE_RSA_WITH_AES_128_GCM_SHA256'},
    'ocsp_stapling': False,
    'server_key_exchange': {'ecdh_params': {'curve_id': {'id': 24,
```

FIG. 5B

```
        'name': 'secp384r1'}}},
    'signature': {'hash_algorithm': 'sha256',
     'signature_algorithm': 'rsa',
     'valid': True},
    'validation': {'browser_error': 'x509: certificate signed by unknown authority',
     'browser_trusted': False},
    'version': 'TLSv1.2'}}}},
 '143': {'imap': {'ssl_2': {'export': False,
    'extra_clear': False,
    'metadata': {},
    'support': False},
   'starttls': {'banner': '* OK [CAPABILITY IMAP4rev1 LITERAL+ SASL-IR LOGIN-REFERRALS ID ENABLE IDLE STARTTLS AUTH=PLAIN] Genel Mail Server Ready.',
    'metadata': {},
    'starttls': 'a001 OK Begin TLS negotiation now.',
    'tls': {'certificate': {'parsed': {'extensions': {'authority_key_id': '44421c59b6722e31f63a936893236150759d5317',
        'basic_constraints': {'is_ca': True},
        'certificate_policies': [],
        'subject_key_id': '44421c59b6722e31f63a936893236150759d5317'},
       'fingerprint_md5': '5c197bb187b0b27f4066643fbd128d38',
       'fingerprint_sha1': '5b6a82e824fa34c7b0515b1c1aad5aeba7c9eb32',
       'fingerprint_sha256': 'ee713fe624087575b4da5b2822d18b2710a867b384aa28290cc22562a58e5786',
       'issuer': {'common_name': ['relay.phn.lan'],
        'organization': ['Dovecot mail server'],
        'organizational_unit': ['relay.phn.lan']},
       'issuer_dn': 'O=Dovecot mail server, OU=relay.phn.lan, CN=relay.phn.lan, emailAddress=root@relay.general-electric.ro',
       'names': ['relay.phn.lan'],
       'redacted': False,
       'serial_number': '10638164172791150670',
       'signature': {'self_signed': True,
        'signature_algorithm': {'name': 'SHA1WithRSA',
         'oid': '1.2.840.113549.1.1.5'},
        'valid': True,
        'value': 'qrsgFBjLrfW6Rx2g1UYuasOjI1CXCkwcisBRJU7A9JiDEF5x3DHQ/0tMnpXnh0wq9pSWVOSg6khapD/5ZuPF1HPT1foSr9wYEFHG Pz/0zq4Jq+tzgGRes9TUWq2j8+Pnafnhp+7aq4TqK+7+pVfB9789BAJCGGmcSoAyYv+UHdA0ZohNAY9zKFL9NVHUUyx/+490h+yn3 eS4iVbFkIncg2itOO997W1TrQx90HwZanFdbCk8vXUZIKpgnx7zq1tFJDFFILpXKqoeIYuCIi19/s2cMXWWzhwd9P3j/NSwbCbHNN PgN7tGs7BkjFseCDtU74Vrr3GD+GnTzBxYczKpGQ=='},
       'signature_algorithm': {'name': 'SHA1WithRSA',
        'oid': '1.2.840.113549.1.1.5'},
       'spki_subject_fingerprint': '39b432ed13464d541b33ec4f78694c38786e7bd08216f272cda67a475cf5d8f5',
       'subject': {'common_name': ['relay.phn.lan'],
        'organization': ['Dovecot mail server'],
        'organizational_unit': ['relay.phn.lan']},
       'subject_dn': 'O=Dovecot mail server, OU=relay.phn.lan, CN=relay.phn.lan, emailAddress=root@relay.general-electric.ro',
       'subject_key_info': {'fingerprint_sha256': '814b501699fff67cbd282ec06406ffffda3080abb16d68320d6714dffb22976c',
        'key_algorithm': {'name': 'RSA'},
        'rsa_public_key': {'exponent': 65537,
         'length': 2048,
         'modulus': 'zQqeJwBv8Mgmkg02H41Sq50206YUGtps0WwzCbUkoHagi8348deOLCG5NkIydWk7DOC7eXWcVYVrTnqsz4cg7wuGjGfBUy1CPyVH AEXBOTDgKgv7mgGtqPISa/USR/qHhXE01UmGsAthu9oYq4ixyY1pi7JehWE+jGKXWKaBDkixXis2D9u3auf+WK+7e0z+MZjfVBUyw K0PyqbdZu6S3dq0HCHrOCUd7I5VMr69noOwrDRiaAvgYnGFwgSwnvJbD2UYBUPEOIjnMdJy2yTeSdNiPmhu8fFAfLXKK5ouD7Wkq5 FDWBvFDW41eTa6D2OaY7Q0IifIPGcR9O1BIWtcew=='}},
       'tbs_fingerprint': 'c1df1075dd61b1f0dc237037f79522fb006546308005f1ff255790a19f49338a',
       'tbs_noct_fingerprint': 'c1df1075dd61b1f0dc237037f79522fb006546308005f1ff255790a19f49338a',
       'validation_level': 'DV',
       'validity': {'end': '2023-08-29T12:03:02Z',
        'length': 315532800,
        'start': '2013-08-29T12:03:02Z'},
```

FIG. 5C

```
      'version': 3}},
    'cipher_suite': {'id': '0xC02F',
      'name': 'TLS_ECDHE_RSA_WITH_AES_128_GCM_SHA256'},
    'ocsp_stapling': False,
    'server_key_exchange': {'ecdh_params': {'curve_id': {'id': 24,
        'name': 'secp384r1'}}},
    'signature': {'hash_algorithm': 'sha256',
      'signature_algorithm': 'rsa',
      'valid': True},
    'validation': {'browser_error': 'x509: certificate signed by unknown authority',
      'browser_trusted': False},
    'version': 'TLSv1.2'}}}},
  '21': {'ftp': {'banner': {'banner': '220 Welcome to General Electric Ftp Server!Please Login!',
    'metadata': {}}}},
  '25': {'smtp': {'ssl_2': {'export': False,
    'extra_clear': False,
    'metadata': {},
    'support': False},
    'starttls': {'banner': '220 alpha.general-electric.ro ESMTP ZSendmail Ready; Sat, 17 Dec 2016 13:18:16 +0200',
      'ehlo': '250-alpha.phn.ro Hello CLIENT_HOSTNAME [CLIENT_IP], pleased to meet you\r\n250-ENHANCEDSTATUSCODES\r\n250-PIPELINING\r\n250-8BITMIME\r\n250-SIZE 52428800\r\n250-DSN\r\n250-ETRN\r\n250-AUTH DIGEST-MD5 CRAM-MD5 LOGIN PLAIN\r\n250-STARTTLS\r\n250-DELIVERBY\r\n250 HELP',
      'metadata': {'description': 'Sendmail', 'product': 'Sendmail'},
      'starttls': '220 2.0.0 Ready to start TLS',
      'tls': {'certificate': {'parsed': {'extensions': {'authority_key_id':
'78420ae3cb33bbe92500ed3ecf2a06edc41d2b8c',
        'basic_constraints': {'is_ca': False},
        'certificate_policies': [],
        'subject_key_id': '3c95f2eb6cdcbaff6de7924bb6aa9ffa6a2d5661'},
      'fingerprint_md5': 'e21bc61f0855ec9e7097669e96001ed4',
      'fingerprint_sha1': '8dace206b928bd65c2d2e77f2332c7668741cfbd',
      'fingerprint_sha256': '2b49fbdd1d3827fa2805eab25f541ab6c19e8eba9c1da404e94df96f0d2e410c',
      'issuer': {'common_name': ['general-electric.ro'],
        'country': ['RO'],
        'locality': ['Bacau'],
        'organization': ['General Electric'],
        'province': ['Bacau']},
      'issuer_dn': 'C=RO, ST=Bacau, L=Bacau, O=General Electric, CN=general-electric.ro, emailAddress=admin@general-electric.ro',
      'names': ['general-electric.ro'],
      'serial_number': '1',
      'signature': {'self_signed': True,
        'signature_algorithm': {'name': 'SHA1WithRSA',
          'oid': '1.2.840.113549.1.1.5'},
        'valid': True,
        'value':
'dbO4kYNjH2FQV4J9n1V5HN1+DYz3bF9j9Gsn9cr62wr5KCCpnd2AtbtffY2Z7Qd1DF0L1QuEqm/aVOkISdHvDoE1C22FmO71JGbO
EbVK95EfWdiibBGQ8OsVqRZEXn2wcgyyMT1Fz4gZ/4qfRuab/k7zUpgp+QX0J4+7JSZqDj4='},
      'signature_algorithm': {'name': 'SHA1WithRSA',
        'oid': '1.2.840.113549.1.1.5'},
      'spki_subject_fingerprint':
'b6745aea8acc0fdd15a62db945c16740b049111fbb8e05a7c077ba42670c56d3',
      'subject': {'common_name': ['general-electric.ro'],
        'country': ['RO'],
        'locality': ['Bacau'],
        'organization': ['General Electric'],
        'province': ['Bacau']},
      'subject_dn': 'C=RO, ST=Bacau, L=Bacau, O=General Electric, CN=general-electric.ro, emailAddress=admin@general-electric.ro',
      'subject_key_info': {'fingerprint_sha256':
'1890a5f95366749fce8f686dc5f8cdeb4dde4e5270abbdde6978343cba0e960c',
        'key_algorithm': {'name': 'RSA', 'oid': ''},
        'rsa_public_key': {'exponent': 65537,
          'length': 1024,
```

FIG. 5D

```
            'modulus':
'1pt1SNsnZ/k8fzjrM5aGjAA1BpZmvOn/4oXKW7sMA5aOW3p1UiObUE8rXHvRcXCooGZYKWXpPyIGKssO1mB/B2MQTSOIbFTN4RVn
fB83bDDUybJKypPyVuvFaRC2N3o0TJ9BZr8iYtKS1IwW51xowev8+GDZBUnAROtJYOK/js8='}},
        'tbs_fingerprint': 'fb66e6cf47f1f4a8802ae68cae9dd4941be0bb25fea7bc1b812cc0feb6658409',
        'tbs_noct_fingerprint': 'fb66e6cf47f1f4a8802ae68cae9dd4941be0bb25fea7bc1b812cc0feb6658409',
        'unknown_extensions': [{'critical': False,
          'id': '2.16.840.1.113730.1.13',
          'value': 'Fh1PcGVuU1NMIEdlbmVyYXR1ZCBDZXJ0aWZpY2F0ZQ=='}],
        'validation_level': 'DV',
        'validity': {'end': '2023-09-08T13:03:20Z',
          'length': 315360000,
          'start': '2013-09-10T13:03:20Z'},
        'version': 3}},
      'chain': [{'parsed': {'extensions': {'authority_key_id':
'78420ae3cb33bbe92500ed3ecf2a06edc41d2b8c',
          'basic_constraints': {'is_ca': True},
          'certificate_policies': [],
          'subject_key_id': '78420ae3cb33bbe92500ed3ecf2a06edc41d2b8c'},
        'fingerprint_md5': 'ac26a49f8a39bc4a0c8354f4c4fbe739',
        'fingerprint_sha1': '81262b4542e87b1a96054e7e9243927a81865dba',
        'fingerprint_sha256': '2ff1d5c8c4b091a4ca68dd1a7bd43027d84e3f5097e5eb461940a3d4f65c30d8',
        'issuer': {'common_name': ['general-electric.ro'],
          'country': ['RO'],
          'locality': ['Bacau'],
          'organization': ['General Electric'],
          'province': ['Bacau']},
        'issuer_dn': 'C=RO, ST=Bacau, L=Bacau, O=General Electric, CN=general-electric.ro,
emailAddress=admin@general-electric.ro',
        'names': ['general-electric.ro'],
        'serial_number': '16362409446285662842',
        'signature': {'self_signed': True,
         'signature_algorithm': {'name': 'SHA1WithRSA',
           'oid': '1.2.840.113549.1.1.5'},
         'valid': True,
         'value':
'weUEqU5KhMrfEkEg8gqP2e8SaANf3SgRwVMFDkMEn/rPZY2xylMlzeLvG0qPijoT8I8PRMM3S1wRpRNEOkFLTesusqWX2abdGEPi
ZZ3VMuebYZYKGIKDWPE+XcLsZotkIQHWwp3LhegTXGnDs2r4o0ljhZBfCimIpNXX1n3U918='},
        'signature_algorithm': {'name': 'SHA1WithRSA',
          'oid': '1.2.840.113549.1.1.5'},
        'spki_subject_fingerprint':
'975313279358cc5c43995c51fdaffa17b3a7af24b19b9fbf1f04c4afa24e433c',
        'subject': {'common_name': ['general-electric.ro'],
          'country': ['RO'],
          'locality': ['Bacau'],
          'organization': ['General Electric'],
          'province': ['Bacau']},
        'subject_dn': 'C=RO, ST=Bacau, L=Bacau, O=General Electric, CN=general-electric.ro,
emailAddress=admin@general-electric.ro',
        'subject_key_info': {'fingerprint_sha256':
'0dac5b067579ba1f1e79c3ded8db2f6e910aa0f9be1a8830111be89b09c0edf8',
          'key_algorithm': {'name': 'RSA', 'oid': ''},
          'rsa_public_key': {'exponent': 65537,
            'length': 1024,
            'modulus':
'3JzfRffn9es5kgpJYuHmMG4ImgR/Y06YYDOD3CvvX44a7UK/nNHJk20qcAzdI0vrlSu4zg5mouKIImM9omZmtY18jVvhNX64lcIY
2VZpg5n1j8I3f9QzKfeAbmspw4kruZdooDVYX0/lMHmoe07W7K6IqavYSN/rfHJqDiZqxZs='}},
        'tbs_fingerprint': '896325176d0d00117f64b289cf4766a022cb56e00e553e2c4d3ed27ad8c86c59',
        'tbs_noct_fingerprint': '896325176d0d00117f64b289cf4766a022cb56e00e553e2c4d3ed27ad8c86c59',
        'validation_level': 'DV',
        'validity': {'end': '2023-09-08T13:02:07Z',
          'length': 315360000,
          'start': '2013-09-10T13:02:07Z'},
        'version': 3}}],
      'cipher_suite': {'id': '0x0005', 'name': 'TLS_RSA_WITH_RC4_128_SHA'},
      'ocsp_stapling': False,
```

FIG. 5E

```
        'validation': {'browser_error': 'x509: certificate signed by unknown authority',
         'browser_trusted': False},
         'version': 'TLSv1.2'}}}},
   '443': {'https': {'dhe': {'metadata': {}, 'support': False},
     'dhe_export': {'metadata': {}, 'support': False},
     'rsa_export': {'metadata': {}, 'support': False},
     'ssl_2': {'export': False,
      'extra_clear': False,
      'metadata': {},
      'support': False}}},
    '80': {'http': {'get': {'body': '<!DOCTYPE HTML PUBLIC "-//IETF//DTD HTML 2.0//EN">\n<html>
<head>\n<title>403 Forbidden</title>\n</head><body>\n<h1>Forbidden</h1>\n<p>You don\'t have
permission to access /\non this server.<br />\n</p>\n</body></html>\n',
      'body_sha256': 'jp0R23oska1/EY4RV8waPJKPzSSn+Z4Y+Hz1zQuJd+g=',
      'headers': {'content_length': '209',
       'content_type': 'text/html; charset=iso-8859-1',
       'server': 'Apache/2.4.10 (Ubuntu) mod_fcgid/2.3.9 PHP/5.5.9-1ubuntu4.20 mod_python/3.3.1
Python/2.7.6 OpenSSL/1.0.1f',
       'unknown': [{'key': 'date', 'value': 'Wed, 16 Nov 2016 11:24:23 GMT'}]},
      'metadata': {'description': 'Apache httpd 2.4.10',
       'manufacturer': 'Apache',
       'product': 'httpd',
       'version': '2.4.10'},
      'status_code': 403,
      'status_line': '403 Forbidden',
      'title': '403 Forbidden'}}},
    '993': {'imaps': {'ssl_2': {'export': False,
      'extra_clear': False,
      'metadata': {},
      'support': False},
     'tls': {'banner': '* OK [CAPABILITY IMAP4rev1 LITERAL+ SASL-IR LOGIN-REFERRALS ID ENABLE IDLE
AUTH=PLAIN] Genel Mail Server Ready.',
      'metadata': {},
      'tls': {'certificate': {'parsed': {'extensions': {'authority_key_id':
'44421c59b6722e31f63a936893236150759d5317',
         'basic_constraints': {'is_ca': True},
         'certificate_policies': [],
         'subject_key_id': '44421c59b6722e31f63a936893236150759d5317'},
        'fingerprint_md5': '5c197bb187b0b27f4066643fbd128d38',
        'fingerprint_sha1': '5b6a82e824fa34c7b0515b1c1aad5aeba7c9eb32',
        'fingerprint_sha256': 'ee713fe624087575b4da5b2822d18b2710a867b384aa28290cc22562a58e5786',
        'issuer': {'common_name': ['relay.phn.lan'],
         'organization': ['Dovecot mail server'],
         'organizational_unit': ['relay.phn.lan']},
        'issuer_dn': 'O=Dovecot mail server, OU=relay.phn.lan, CN=relay.phn.lan,
emailAddress=root@relay.general-electric.ro',
        'names': ['relay.phn.lan'],
        'redacted': False,
        'serial_number': '10638164172791150670',
        'signature': {'self_signed': True,
         'signature_algorithm': {'name': 'SHA1WithRSA',
          'oid': '1.2.840.113549.1.1.5'},
         'valid': True,
         'value':
'qrsgFBjLrfW6Rx2g1UYuasOjIlCXCkwcisBRJU7A9JiDEF5x3DHQ/0tMnpXnh0wq9pSWVOSg6khapD/5ZuPF1HPT1foSr9wYEFHG
Pz/0zq4Jq+tzgGRes9TUWq2jB+Pnafnhp+7aq4TqK+7+pVfB9789BAJCGGmcSoAyYv+UHdAOZohNAY9zKFL9NVHUUyx/+490h+yn3
eS4iVbFkIncg2itO0997WlTrQx90HwZanFdbCkBvXUZIKpgnx7zq1tFJDFFILpXKqoeIYuCIi19/s2cMXWWzhwd9P3j/NSwbCbHNN
PgN7tGs7BkjFseCDtU74Vrr3GD+GnTzBxYczKpGQ=='},
        'signature_algorithm': {'name': 'SHA1WithRSA',
         'oid': '1.2.840.113549.1.1.5'},
        'spki_subject_fingerprint':
'39b432ed13464d541b33ec4f78694c38786e7bd08216f272cda67a475cf5d8f5',
        'subject': {'common_name': ['relay.phn.lan'],
         'organization': ['Dovecot mail server'],
         'organizational_unit': ['relay.phn.lan']},
```

FIG. 5F

```
        'subject_dn': 'O=Dovecot mail server, OU=relay.phn.lan, CN=relay.phn.lan,
emailAddress=root@relay.general-electric.ro',
        'subject_key_info': {'fingerprint_sha256':
'814b501699fff67cbd282ec06406ffffda3080abb16d68320d6714dffb22976c',
            'key_algorithm': {'name': 'RSA'},
            'rsa_public_key': {'exponent': 65537,
              'length': 2048,
              'modulus':
'zQqeJwBv8Mgmkg02H41Sq50206YUGtps0WwzCbUkoHagi8348deOLCG5NkIydWk7DOC7eXWcVYVrTnqsz4cg7wuGjGfBUylCPyVH
AEXBOTDgKgv7mgGtqPISa/USR/qHhXE01UmGsAthu9oYq4ixyY1pi7JehWE+jGKXWKaBDkixXis2D9u3auf+WK+7e0z+MZjfVBUyw
K0PyqbdZu6S3dq0HCHrOCUd7I5VMr69noOwrDRiaAvgYnGFwgSwnvJbD2UYBUPEOIjnMdJy2yTeSdNiPmhu8fFAfLXKK5ouD7WkqS
FDWBvFDW41eTa6D20aY7Q0Iif1PGcR9O1BIWtcew=='}},
        'tbs_fingerprint': 'c1df1075dd61b1f0dc237037f79522fb006546308005f1ff255790a19f49338a',
        'tbs_noct_fingerprint': 'c1df1075dd61b1f0dc237037f79522fb006546308005f1ff255790a19f49338a',
        'validation_level': 'DV',
        'validity': {'end': '2023-08-29T12:03:02Z',
          'length': 315532800,
          'start': '2013-08-29T12:03:02Z'},
        'version': 3}},
      'cipher_suite': {'id': '0xC02F',
        'name': 'TLS_ECDHE_RSA_WITH_AES_128_GCM_SHA256'},
      'ocsp_stapling': False,
      'server_key_exchange': {'ecdh_params': {'curve_id': {'id': 24,
          'name': 'secp384r1'}}},
      'signature': {'hash_algorithm': 'sha256',
        'signature_algorithm': 'rsa',
        'valid': True},
      'validation': {'browser_error': 'x509: certificate signed by unknown authority',
        'browser_trusted': False},
      'version': 'TLSv1.2'}}}},
  'autonomous_system': {'asn': 6830,
    'country_code': '',
    'description': 'LGI-UPC formerly known as UPC Broadband Holding B.V., AT',
    'name': 'LGI-UPC',
    'organization': 'formerly known as UPC Broadband Holding B.V., AT',
    'path': [6830],
    'rir': 'unknown',
    'routed_prefix': '80.96.177.0/24'},
  'ip': '80.96.177.217',
  'location': {'city': '',
    'continent': 'Europe',
    'country': 'Romania',
    'country_code': 'RO',
    'latitude': 46.0,
    'longitude': 25.0,
    'postal_code': '',
    'province': '',
    'registered_country': 'Romania',
    'registered_country_code': 'RO',
    'timezone': 'Europe/Bucharest'},
  'metadata': {'os': 'Ubuntu', 'os_description': 'Ubuntu'},
  'protocols': ['80/http',
    '993/imaps',
    '25/smtp',
    '110/pop3',
    '21/ftp',
    '143/imap',
    '443/https'],
  'tags': ['pop3', 'ftp', 'http', 'smtp', 'imap', 'imaps'],
  'updated_at': '2017-01-23T07:01:27+00:00'}
```

FIG. 5G

```
Step 3 : IP Info DB
```
```
'OK;;80.96.177.0;RO;Romania;Bacau;Bacau;600550;46.5667;26.9;+02:00'
```

FIG. 5H

```
{'html_attributions': [],
 'results': [{'geometry': {'location': {'lat': 46.57009, 'lng': 26.9057},
     'viewport': {'northeast': {'lat': 46.5714389802915,
        'lng': 26.9070489802915},
     'southwest': {'lat': 46.5687410197085, 'lng': 26.9043510197085}}},
   'icon': 'https://maps.gstatic.com/mapfiles/place_api/icons/generic_business-71.png',
   'id': 'c45aa1d937fdd3c8bc641df4367af73f00070852',
   'name': 'Grup Termloc S.A.',
   'place_id': 'ChIJyXnU3d9vtUARINmH8bxnXqA',
   'reference': 'CmRSAAAAWUGpO-
TMpH1Fs12GY4wfA1KqSxhgz0f3ketIsRb0GRyBvQHwYNCre0j0EjWjDdLNW6t2jjUZN8HEeubacBBw1PrgLad8vemMNeMAPXjS2J1
gWFj2dRmJK6k8WyaNQA3EEhAIKpq0kri1UYD9ziMs1C50GhS2QNGETbhThsLDQa8GOXFkMTQzNg',
   'scope': 'GOOGLE',
   'types': ['point_of_interest', 'establishment'],
   'vicinity': 'Str. Bacovia George, 41-43, Bacau, Bacau, 600238, Bacău'}],
 'status': 'OK'}
```

FIG. 5I

SYSTEMS AND METHODS FOR DETECTING AND LOCATING UNSECURED SENSORS IN A NETWORK

CROSS-REFERENCE TO RELATED PATENT APPLICATIONS

This application claims priority to U.S. Provisional Application No. 62/471,383 filed on Mar. 15, 2017, the content of which is hereby incorporated by reference in its entirety.

BACKGROUND

Unsecured industrial sensors and controllers present a security risk for the mission-critical facilities and enterprise supply chain customers, suppliers, and even the enterprise itself. These unsecured devices are vulnerable to attack which can disrupt operations and even cripple the business.

These unsecured sensors and controllers pose significant challenges across industries, affecting multiple types of enterprises and users. Industrial companies, for example, deploy millions of industrial sensors around the world for monitoring and/or controlling the operation of facilities and/or equipment in the facilities of their enterprise customers. Understanding the identity of industrial sensors and controllers is the fundamental first step to protect these sensors and controllers. These enterprise customers rely on manufacturers of the sensors and controllers to provide insights into the health of the industrial sensors and controllers, security level, the unique identifiers, locations of the industrial sensors so that their industrial assets can be proactively protected from potential vulnerabilities and cybersecurity attacks. Other type of firms such as those that invest in industrial assets controlled, monitored, or orchestrated by industrial sensors and controllers have an interest in knowing whether their assets or investments could be easily compromised. Risk managers and compliance officers have interests in knowing whether their key suppliers, contractors and customers could be affected by potential vulnerabilities of installed industrial sensors and controllers. Therefore, understanding the identity of the industrial sensors and controllers and developing insight into the health of the sensors and controllers including their identifier and location are essential in protecting asset owners and enterprise customers with assets installed with industrial sensors and controllers.

SUMMARY

Embodiments of the systems and methods are related to systems and methods for detecting unsecured industrial network-connected devices, such as sensors and/or controllers (e.g., PLC controllers) that expose an entity's operations and/or processes to security risks. The systems and methods provide a powerful approach and interactive visualization interface that effectively provides insights into exposed industrial network-connected device (e.g., sensors and controllers) that might be vulnerable to attacks. Beyond identifying the exposed and vulnerable industrial sensors/controllers, the systems and methods also identify customers and other entities in a supply chain that could be affected if one or more of these unsecured industrial sensors become comprised.

Embodiments of the disclosed automated processes and systems include IP-geolocation and linked data to identify potential customers and other entities in a supply chain. Embodiments of the disclosed system replaces manual processes implemented by security analysts at major entities. These analysts have to manually search multiple sources, conduct extensive research and make subjective determinations after stringing together various pieces of information. Embodiments of the disclosed automated system provides actionable intelligence in real-time through automated and systematic approach to identify underlying risk. This latter approach saves time, help scale security operations in monitoring and proactively identifying vulnerable and unsecured industrial sensors, and reduces overall enterprise risk in the supply chain.

Embodiments of the system can include an automated data pipeline built in a programming and/or scripting language that executes steps to compile a list of customer and entities in the supply chain that are at increased risk/vulnerability because Internet of Things (IoT) devices or other sensors associated with the entities, are erroneously connected to a network.

Embodiments of the automated system solves the manual process for detecting cybersecurity risk associated with unsecured industrial sensors (specifically with exposed and open IP addresses). IP providers often mask location information associated with network-connected industrial sensors and their entities. This lack of information makes the necessary geo-locating vulnerable and unsecured industrial sensors as first step for timely remediation of potential system-wide comprise and alerting of entities and customers extremely difficult. Embodiments of the automated system overcome the geolocation masking by using multiple sources of information and following "bread crumbs" to determine accurate geolocation information associated with the sensor (e.g., an industrial network-connected device). For example, in exemplary embodiments, the automated system links information from various domains to uncover the location of the unsecured sensor and to associate the sensor with potential entities who are at risk.

In accordance with embodiments of the present disclosure, a computing system is communication with a network. The computing system includes one or more computing devices. Each computing device includes a processor and a non-transitory computer-readable medium. The non-transitory computer-readable medium stores a detection and alerting application. The computing system is configured to find an IP address associated with an unsecured sensor (or other industrial network-connected device) based on a port through which the unsecured sensor communicates with the network. The computing system ascertains a prefix route associated with the IP address for the unsecured sensor based on a portion of the IP address. The computing system further, determines geographic coordinate data associated with the prefix route of the unsecured sensor and identifies location data corresponding to a set of facilities within a specified geographic radius of the geographic coordinate data. The computer system associates the unsecured sensor with a first one of the facilities in the set of facilities based on a distance between geographic coordinate data and the location data associated with the first one of the facilities being within a specified distance threshold.

In accordance with embodiments of the present disclosure, the geographic coordinate data can include longitude and latitude data. The unsecured sensor can be an Internet of Things (IoT) device or other sensor/controller connected to communication network and can be configured to transmit and receive data associated with an operation of a device/equipment at the first one of the facilities. In one embodiment, the computing system alerts the entity associated with the first one of the facilities to the existence of the unsecured sensor in response to associating the unsecured sensor with the first one of the facilities.

In accordance with embodiments of the present disclosure, the computing system includes a graphical user interface (GUI). The computing system renders, via the GUI, a geographic map on which the geographic coordinate data of the prefix route associated with the unsecured sensor and the location data corresponding to the set of facilities can be overlaid. The computing system can render, via the GUI, information associated with the set of facilities within the specified geographic radius of the geographic coordinate data. The computing system can derive the port through which the unsecured sensor communicates based on input received via the GUI that indicates a type of sensor the computing system is tasked with detecting.

In accordance with embodiments of the present disclosure, the computing system can find an IP address associated with the unsecured sensor based on the port through which the unsecured sensor communicates with the network; a name of a manufacturer of the unsecured sensor; and a geographic region within which the unsecured sensor resides. The computing system can interface with one or more other systems or data repositories to find the IP address associated with the unsecured sensor; the name of the manufacturer of the unsecured sensor; and/or the geographic region within which the unsecured sensor is located.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

The accompanying figures, which are incorporated in and constitute a part of this specification, illustrate one or more embodiments of the present disclosure and, together with the description, help to explain embodiments of the present disclosure. The embodiments are illustrated by way of example and should not be construed to limit the present disclosure. In the figures:

FIGS. 5A-I are exemplary output files in relation to FIG. 4;

DETAILED DESCRIPTION

Described herein are embodiments of systems and associated methods for detecting unsecured industrial sensors that expose an entity's operations and/or processes to security risks. As one non-limiting example, an industrial network-connected device (e.g., an industrial sensor/controller) can be configured to communicate with network and can be configured to monitor and/or control the operation of equipment in a water treatment facility. While illustrative embodiments are generally described herein for detecting and locating unsecured sensors, exemplary embodiments of the present disclosure can facilitate the detection and location of other industrial network-connected devices, such as pumps, controllers, valves, switches, actuators, motors, x-ray scanners, and any other suitable industrial network-connected devices.

If certainty security measures are not satisfied (e.g., the industrial sensor is not behind the facilities network firewall), the industrial sensor can be considered unsecured and vulnerable to a cyber-attack. Since so many of these sensors are deployed throughout facilities and so many of these sensors have been operational for decades, the entities responsible for these sensors are often not aware of these unsecured sensors, and therefore, are often not aware of the security risk they pose. Exemplary embodiments of the described systems and methods can detect the existence of such unsecured sensors and determine the facility at which the unsecured sensor resides and operates without any prior knowledge of the existence of the unsecured sensor, the location of the unsecured sensor, or the facility within which they reside and operate.

Figure 1:
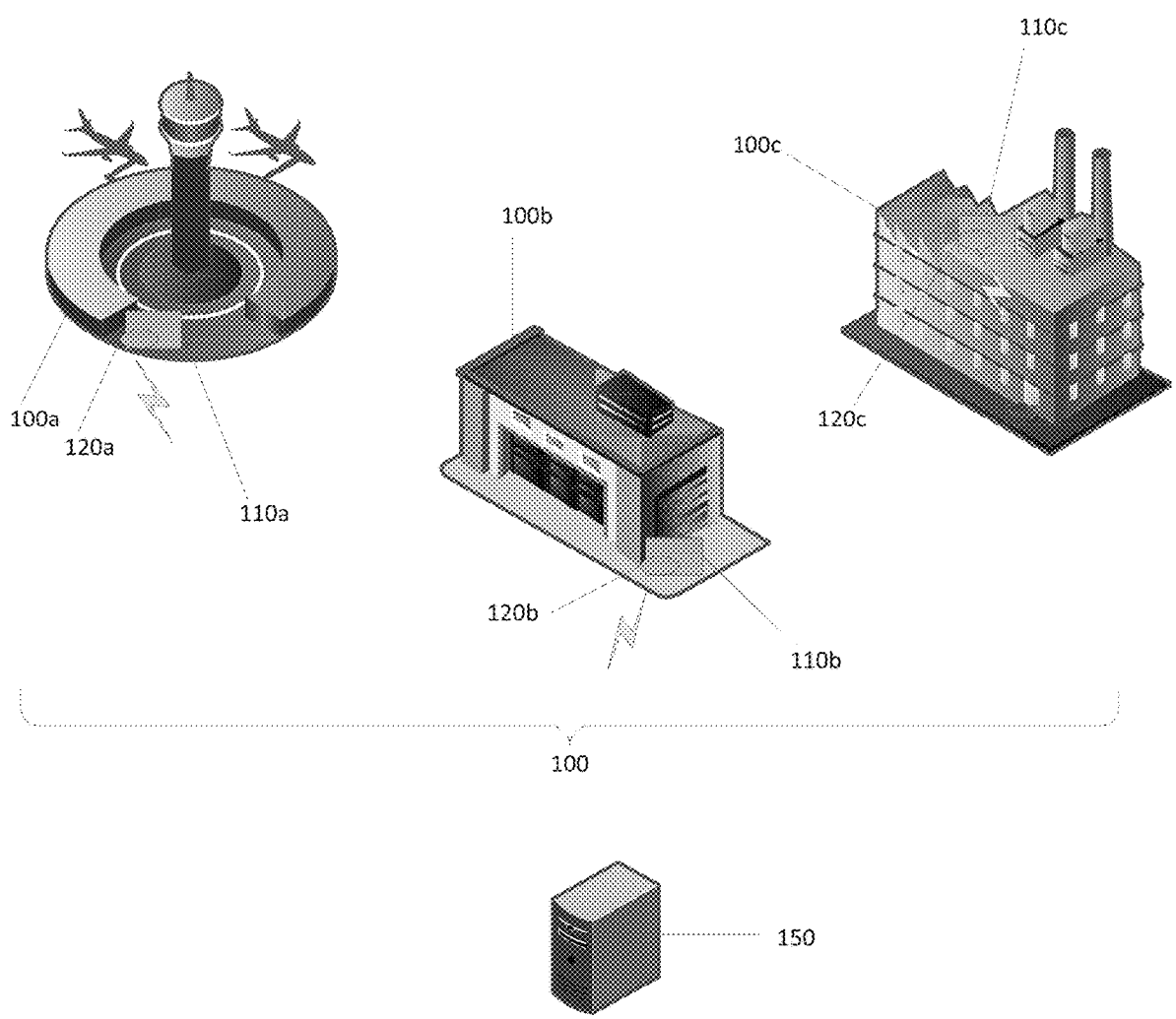
FIG. 1 is a block diagram that depicts sensors disposed at facilities in accordance with an exemplary embodiment.

FIG. 1 is a block diagram that depicts sensors 120 disposed at facilities 100 in accordance with an exemplary embodiment of the present disclosure. While illustrative embodiments describe detecting and locating unsecured sensors 120, exemplary embodiments of the present disclosure can facilitate detecting and locating of other industrial network-connected devices, such as pumps, controllers, valves, switches, actuators, motors, x-ray scanners, and any other suitable industrial network-connected devices, which can be interchanged with the sensors 120 herein. In exemplary embodiments, the facilities 100 can include industrial equipment or industrial devices 100. The sensors 120 can be Internet of Things (IoT) compatible sensors or otherwise configured to communicate via a network (e.g., the Internet). The sensors 120 can connect to a network and exchange data. The sensors 120 and industrial device 110 can be uniquely identifiable and can be monitored and/or controlled remotely across a network infrastructure. The sensors 120 can be assigned a specified Internet Protocol (IP) address and can connect to the network via a specified port. A computing system 150 can detect and communicate with the sensor 120 using, for example, the IP address and specified port.

As an example, facility A 100A can be an airport. The sensor 120A can be disposed on or with respect to an industrial device 110A. The sensor 120A can monitor and/or control the operations of the industrial device 110A. As a non-limiting example, the industrial device 110A can be one or more of runway digital signs, gate control devices, fuel tankers, and/or runway light controls.

As another example, facility B 100B can be a warehouse. The sensor 120B can be disposed on or with respect to industrial device 110B. The sensor 120B can monitor and/or control the operations of the industrial device 110B. As a non-limiting example, the industrial device 110B can be one or more of air flow devices, assembly line control devices, autonomous ground vehicles, and other devices typically utilized in a warehouse.

As another example, facility N 100N can be a factory and/or power plant. The sensor 120N can be disposed on or with respect to industrial device 110N. The sensor 120N can monitor and/or control the operations of the industrial device 110N. As a non-limiting example, the industrial device 110N can be one or more of electric motors, pumps, nuclear reactors, steam generators, boilers, turbines, nuclear reactor coolant pump, generators, assembly line control devices, autonomous ground vehicles, and other devices typically utilized in a factory and/or power plant.

It can be appreciated the facilities 100 can include any facility in which industrial sensors 120 are utilized to monitor and/or control industrial devices 110. Other example facilities can include water treatment facilities, water departments, and sanitation departments.

Figure 2A:
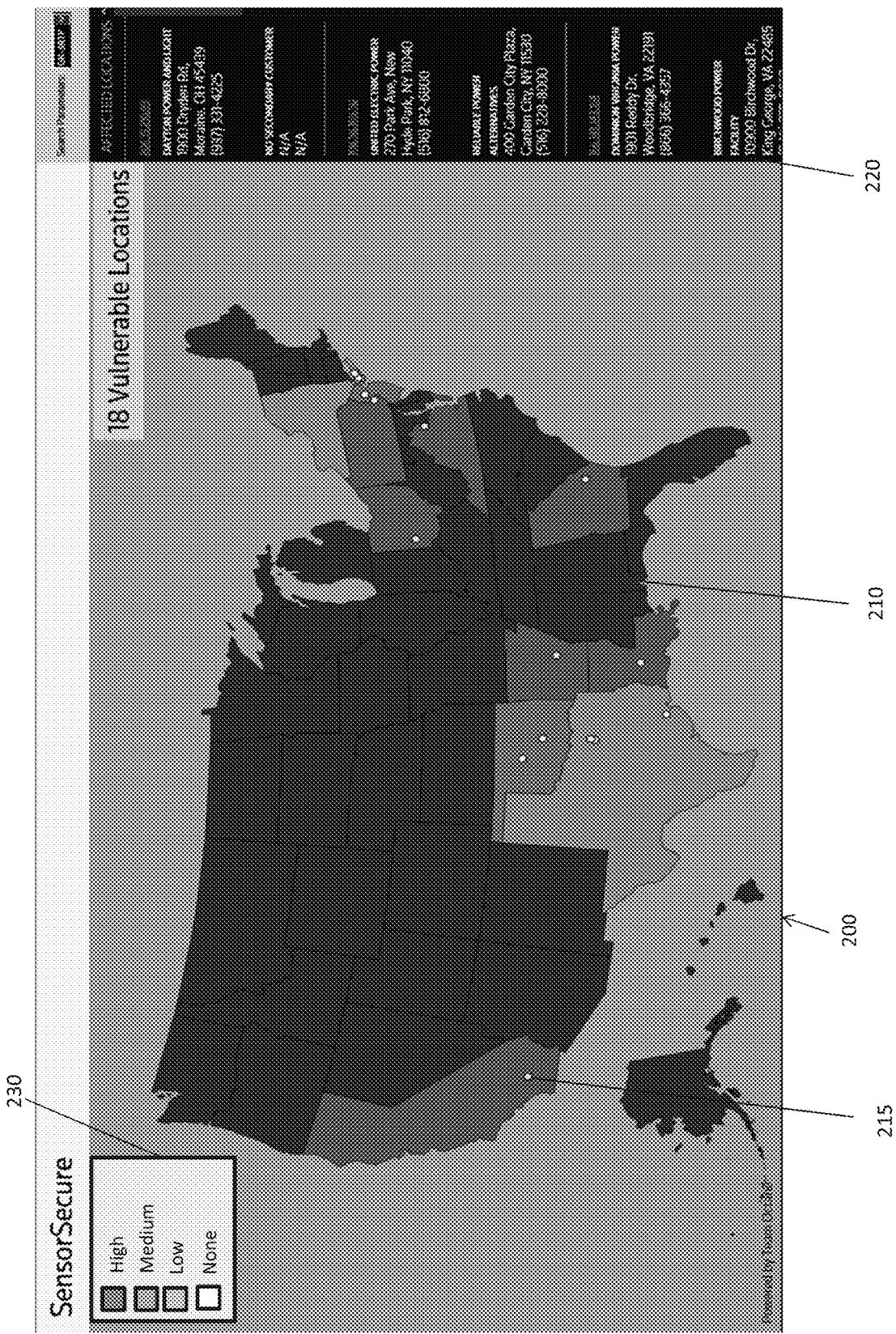
FIGS. 2A-C illustrate a graphical user interface (GUI) for a system for detecting and locating unsecured sensors in a network.
Figure 2B:
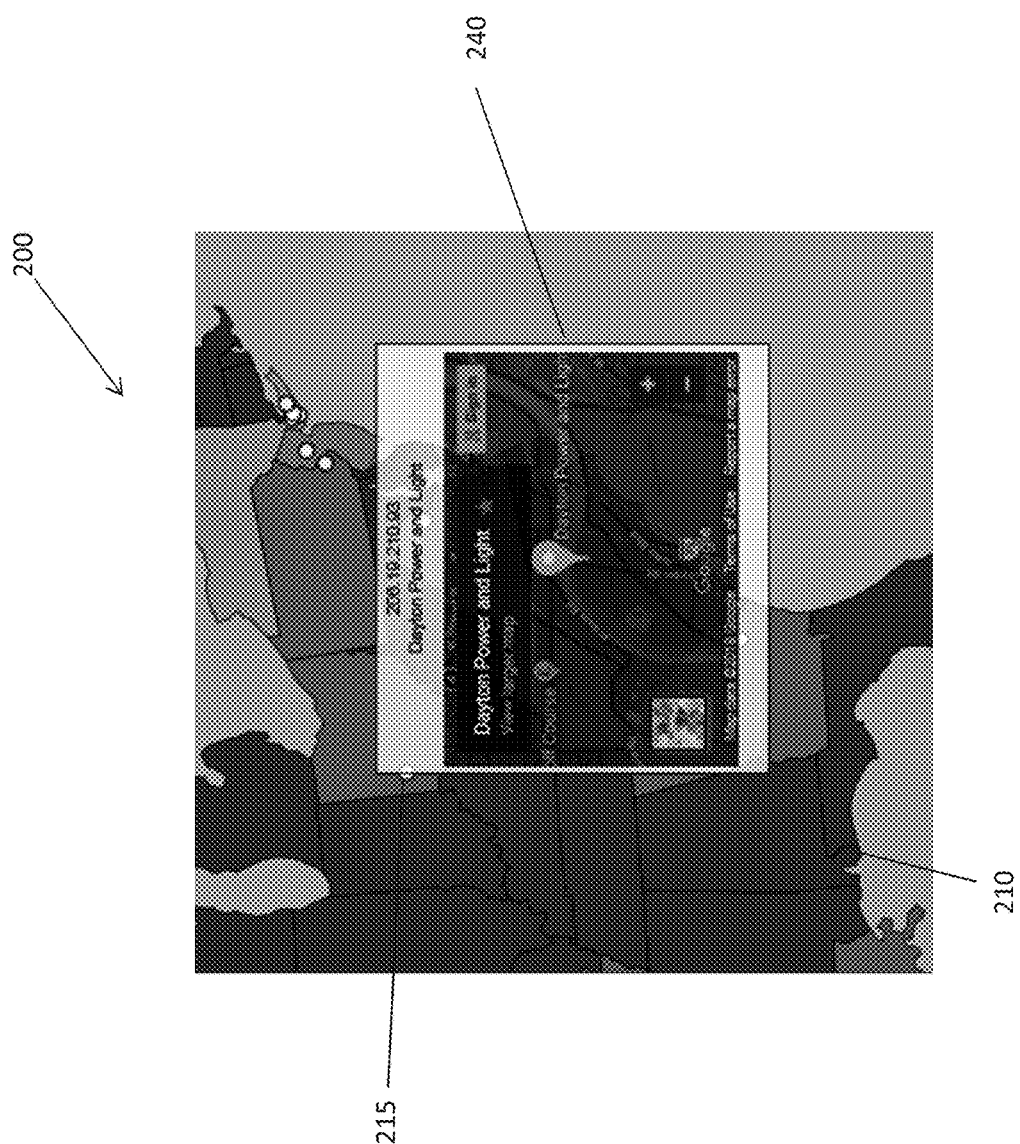
Figure 2C:
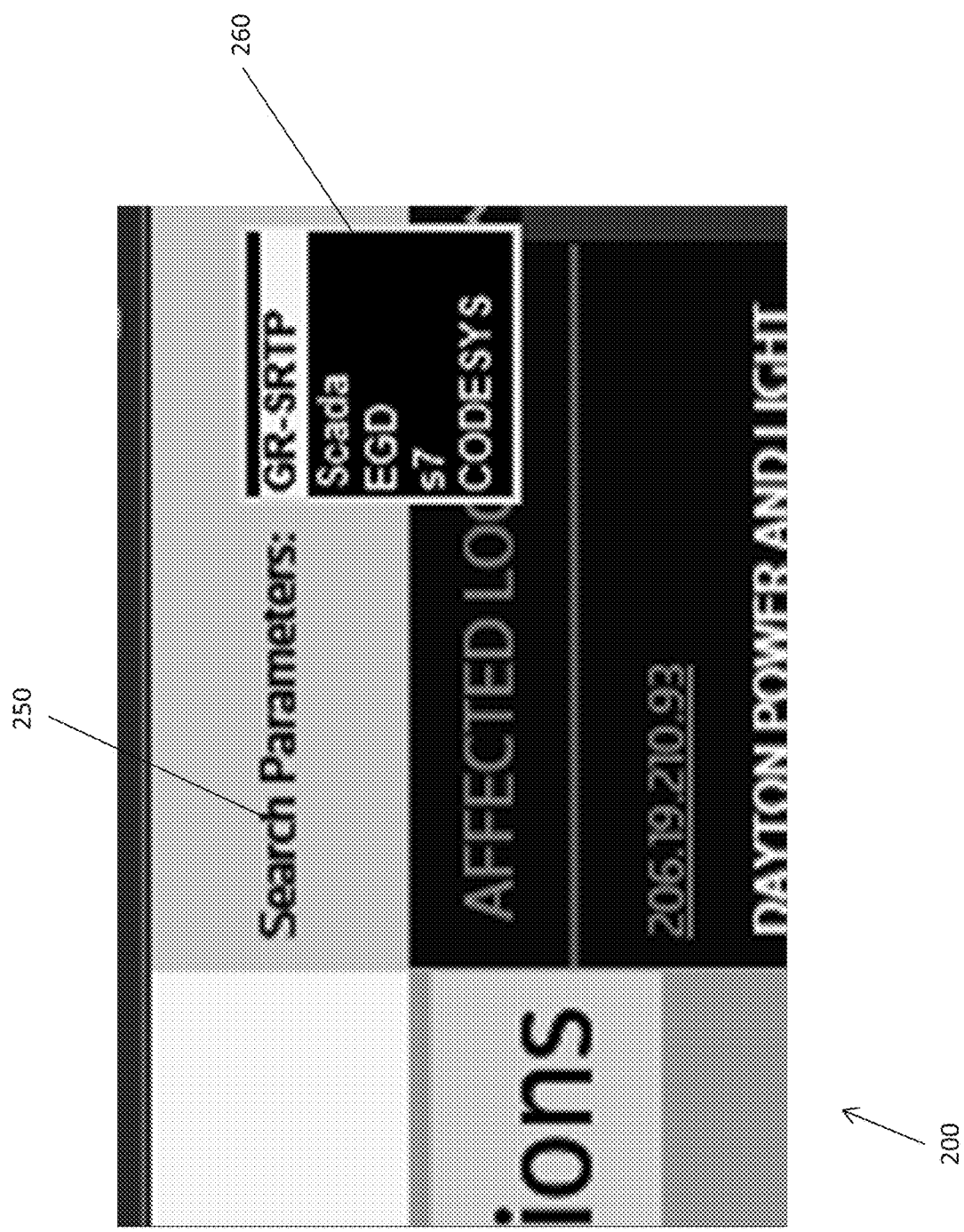

FIGS. 2A-C illustrate a graphical user interface (GUI) 200 that can be generated by embodiments of a system for detecting and locating unsecured sensors in a network in accordance with embodiments of the present disclosure. With reference to FIG. 2A, in an exemplary embodiment, the graphical user interface 200 can render a geographic map 210, data points 215 on the geographic map 210, an information window 220, and a legend 230. The data points 215 can represent locations where unsecured sensors have been detected. The information window 220 can display information related to the detected unsecured sensors. For example, the information window 220 can display a name of the location, a geographic address, and an IP address. The map can also be color coded. The colors can indicate the levels of vulnerability. For example, the legend 230 can indicate colors illustrate higher vulnerability. As a non-limiting example, the graphical user interface 200 can developed using HTML5, JavaScript, CSS3, jQuery, and D3.js. The graphical user interface 200 can be rendered on displays of smartphones, laptops, tablets, desktop computers, servers or network appliances.

In one embodiment, the graphical user interface 200 can also display a confidence score with respect to the locations of the unsecured sensors. The graphical user interface 200 can also include details associated with the unsecured sensors. In another embodiment, the graphical user interface 200 can interface or be incorporated with systems, such as Thomson Reuters Intelligent Tagging (TRIT) and PermID® (PermID.org).

With reference to FIG. 2B, in response to hovering over, clicking on, or otherwise selecting one of the data points 215 on the geographic map 210, a window 240 can be displayed over the geographic map 210, on or with respect to the selected one of the data points 215. The window 240 can display information associated with the detected unsecured sensors associated with the selected one of the data points 215. The window 240 can include names of facilities sharing the location of the selected one of the data points 215, IP addresses associated with the facilities, and locations of the facility shown on a map. In some embodiments, the map can be generated by a web based mapping service, such as the web-based mapping services Google Maps®, Waze®, Yahoo Maps®, or Map Quest®. In one embodiment, an Application Program Interface (API) can be used to integrate the web based mapping service in the window 240 of the GUI 200.

With reference to FIG. 2C, the parameters 250 for searching unsecured sensors can be modified using the dropdown menu 260 located on the graphical user interface 200. In the present example, the parameters 250 listed in the dropdown menu 260 are types of IoT devices. It can be appreciated that the parameters 250 can include types of industrial devices, types of sensors, types of facilities, port numbers, and/or any other suitable types of parameters associated with the facilities, devices and/or sensors that can be used by the system to detect unsecured sensors.

Figure 3:
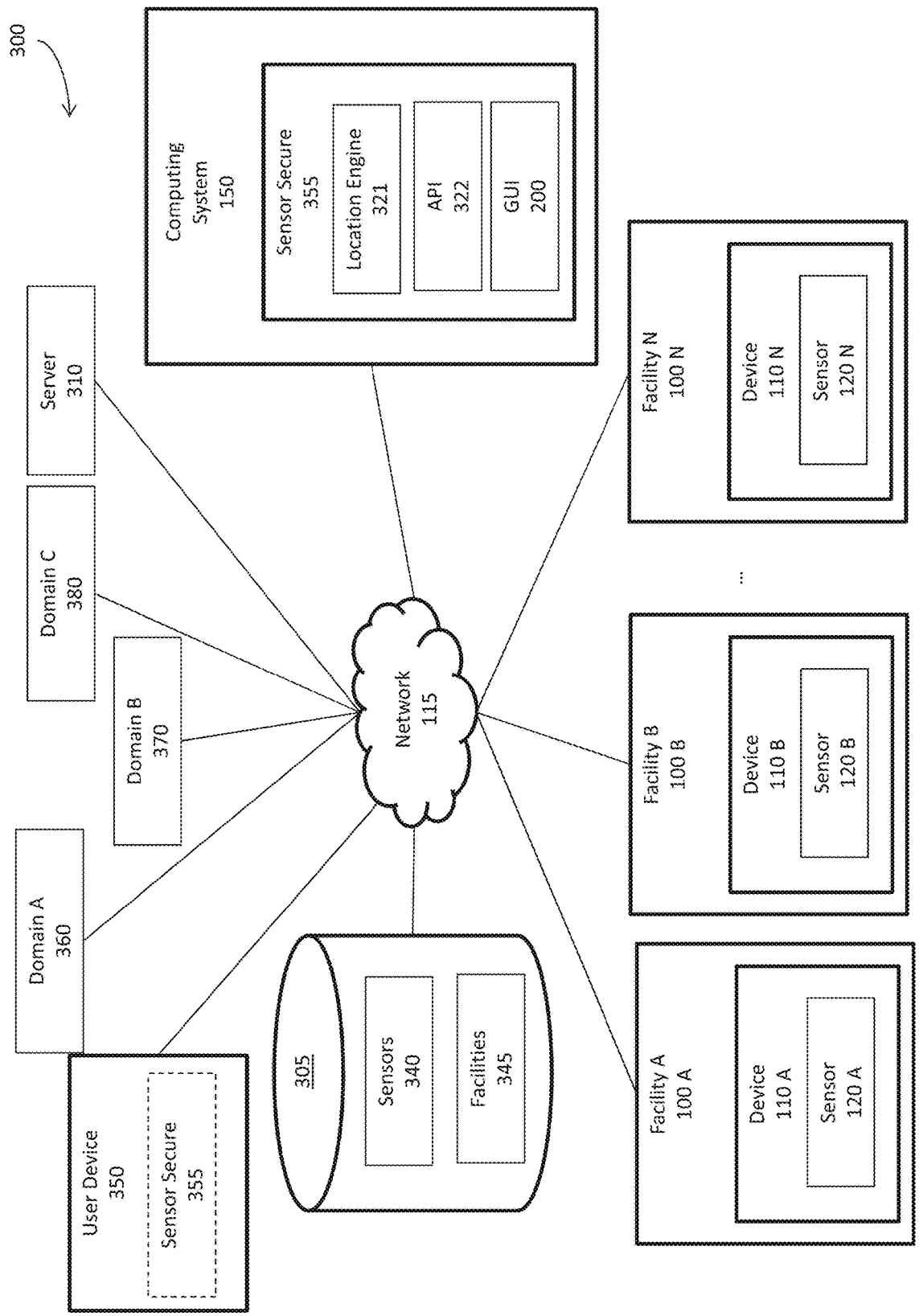
FIG. 3 is a block diagram illustrating the system for detecting and locating unsecured sensors in a network in accordance with an exemplary embodiment.

FIG. 3 is a block diagram illustrating a network environment in which a system 300 is implemented to detect and locate unsecured sensors in a network in accordance with an exemplary embodiment. The system 300 can include one or more computing systems 150, one or more databases 305, one or more servers 310, one or more user computing devices 350, one or more domains A 360, one or more domains B 370, one or more domains C 380. One or more facilities A 100A, one or more facilities B 100B, and one or more facilities N 100N can each include an industrial sensor 120A, 120B and 120N, respectively. The industrial sensors 120A, 120B, and 120N can monitor and/or control operations and/or processes within the facilities 100A, 100B, and 100N, respectively. For example, the industrial sensors 120A, 120B, and 120N can monitor and/or control industrial devices 110A, 110B and 110N, respectively. In one exemplary embodiment, the computing system 150 can be in communication with the database(s) 305, computing devices 350, the domains A-C 360-380, and the sensors 120A, 120B and 120N, via a communications network 315. The computing system 150 can execute a control engine 320. The control engine 320 can include applications such as, the location engine 321 and one or more APIs 322. The computing system 150 can also implement an embodiment of the graphical user interface 200. The control engine 320 can implement one or more processes for detecting and locating unsecured sensors in a network using the location engine 321 and one or more APIs 322. A sensor secure application 355 can reside on one of the computing system 150 and can be accessible to the user computer device 350. For example, the user computer device 350 can execute a web browser or other application and can navigate to a universal resource locator (URL) associated with the sensor secure application 355 on the computing system 150, and the user computing device 350 can interact with the sensor secure application 355 via the web browser. Alternatively, at least a portion of the sensor secure application 355 can reside on the user computing device 350 or one of the servers 310.

In an example embodiment, one or more portions of the communications network 315, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 150 may include one or more computers or processors configured to communicate with the database(s) 305, the computing devices 350, the domains 360-380, and the sensors 120A, 120B and 120N via the network 115. The computing system 150 may host one or more applications, such as the sensor secure application 355, configured to interact with one or more components of the computing devices 350, domains 360-380, the sensors 120A, 120B and 120N and/or facilitates access to the content of the databases 305. The databases 305 may store information/data, as described herein. For example, the databases 305 can include a sensors database 340 and a facilities database 345. The sensors database 340 can store information associated with sensors 120A-N. The facilities database 345 can store information associated with facilities. The data in the databases 305 can be added to the database when the sensor secure application detects and locates new unsecured sensors and associated facilities. The databases 305 can be located at one or more geographically distributed locations from each other or from the computing system 150. Alternatively, the databases 305 can be included within in the computing system 150.

In an exemplary embodiment, a user computing device 350 can execute the sensor secure application 355 (e.g., as it resides on the user computing device 350 or via a web browser) to interface with the computing system 150. In response to executing the sensor secure application 355, the computing system 150 can render the graphical user interface 200 on the user device 350. The computing system 150 can receive input from the user device 350, via the graphical user interface 200. The input can be parameters for searching for unsecured sensors 110A-N disposed in a specified geographic location. The parameters can be a specified sensor, port number, manufacturer name, or device type.

In response to receiving the parameters, the computing system 150 can execute the sensor secure application to find unsecured sensors that match the input parameters. In one embodiment, the sensor secure application 355 can use one or more APIs 322 to interface with the domains A-C 360-380. The one or more processors of the computing system can execute the sensor secure application 355 to generate a first search query for retrieving IP addresses for potentially unsecured and/or vulnerable sensors based on the input parameters and can execute the query via a service executing on the domain A 360. The query can be to retrieve a list of potential vulnerable IP addresses related to the input parameters. For example, the input parameters can be for connected General Electric IoT (GE-IoT) devices, such as the programmable logic controller (PLC) 90*30 Series controllers and can specify a port number that the controller uses to communicate with the network 115 to limit the search to certain types of devices. Such PLC controllers operate on ports 18245 and 18246. In a non-limiting example, the service executing on domain A 360 can crawl the network 115 for devices that are connected to the network and can maintain an index of IP addresses, ports, device details (type, manufacture, etc) associated with the devices. In one non-limiting example, the service can be a search engine provided by Shodan® (Shodan.io) Continuing with the non-limiting example, the query generated by the one or more processors executing the sensor secure application 355 can be: "port:18245,18246 product: 'general electric' country: 'US'. In one example, the IP addresses can be returned as a csv file.

In response to receiving the IP addresses the one or more processors can execute the sensor secure application 355 to generate a second query based each IP address returned from the service of domain A. The second query can be generated to retrieve additional information associated with the returned IP addresses. The sensor secure application 355 can generate the second query and execute the query via a service executing on the domain B 370 to retrieve a prefix_route of each IP address included in the second query. In a non-limiting example the service can be a search engine provided by Censys (Censys.io). The sensor secure application 355 can use a portion of the IP addresses returned from the first query to retrieve the prefix_route in the second query. The prefix_route of an IP address is identified by a subnet mask of the IP address. For example, the prefix_route is determined by applying a bitwise AND operation on the subnet mask and any IP address in the network. As a non-limiting example, the prefix_route for IP address 220.19.253.51 can be 220.19.0.0/16. The number of bits (16) prefix of the IP address are appended after the slash (/) character separator. The IP address can be IPv4 and/or IPv6.

In response to receiving the prefix_route, the sensor secure application 355 can generate a third query using the prefix_route for each IP address to retrieve latitude and longitude information for the IP address. The sensor secure application 355 can generate and execute the query via a service on the domain C 380. In a non-limiting example, the service can be an IP geolocation service that provides location information for pre-fix routes, such as IPInfoDB (ipinfodb.com).

In response to receiving the latitude and longitude information for each prefix route, the location engine 321 of the sensor secure application 355 can plot the latitude and longitude information on a geographic map. The location engine 321 can search for facilities (e.g., facilities A-N 100A-100N), in the facilities database 345, that are within a specified distance of the location associated with the latitude and longitude information for each prefix route. In a non-limiting example, the location engine 321 can interface with a mapping service, such as Google Maps®, Waze®, Yahoo Maps®, or Map Quest® to facilitate mapping the facilities. As described above, the prefix route can be associated with IoT sensors (e.g., sensors 120A-120N). The sensor secure application 355 can identify an unsecured/vulnerable sensor disposed at a facility in response to determining the facility is within a specified distance of the latitude and longitude of the prefix route and determining that the facility includes the type of sensors that correspond to the detected sensor(s).

In response to identifying the potentially unsecured/vulnerable sensors the sensor secure application 355 can transmit an alert to the entity associated with the facility at which the unsecured/vulnerable sensor is disposed. For example, in the event the sensor 120B is identified as a potential unsecured/vulnerable sensor, the sensor secure application 355 can transmit an alert to entity associated with the facility B 100B. The user device 350 can be associated with the facility. Continuing with the example, the alert can be displayed on the graphical user interface 200 rendered on the user device 350. In one embodiment, the alert can include options for securing the sensors. For example, the alert can include options for powering the sensor off, encrypting the IP address, powering off a device associated with the sensor, pinging the sensor to obtain additional information about the sensor, moving the sensor behind the network firewall of the facility, establishing access control parameters (security codes or passwords), and the like. Continuing with the example, the computing system 150 can receive input to secure the sensor 120B via the GUI of the sensor secure application 355 and can remotely control the sensor 120B to secure the sensor 120B, as described above.

In one embodiment, the sensor secure application 355 can plot the locations of the facilities associated with the identified potentially unsecured/vulnerable sensor on a geographic map (e.g., the geographic map 210 as shown in FIG. 2) on the graphical user interface 200 rendered on the user device 350. As described above with reference 2, the graphical user interface 200 can display the details associated with the identified sensors and facilities.

The sensor secure application 355 can maintain data on unsecured sensors it detects as well as data on the facilities it determines are associated with the unsecured sensors. For example, in some embodiments, the sensor secure application can execute general queries to retrieve IP addresses, prefix routes, and longitude and latitude data for various devices connected to the network via various ports. The sensor secure application 355 can use this data to build a cached index of devices and associated facilities to reduce query times and improve retrieval times. For example, the sensor secure application 355 can check the cache for the requested results before generating and submitting queries to the services of the domains.

Based on input from the user device 350, the computing system 150 can refresh/re-execute the search for unsecured/vulnerable IP addresses based on specified parameters, after a specified time frame. Alerts associated with the identified unsecured/vulnerable sensors, can be automatically transmitted to the user device 350, in response to the refreshed/re-executed search.

Figure 4:
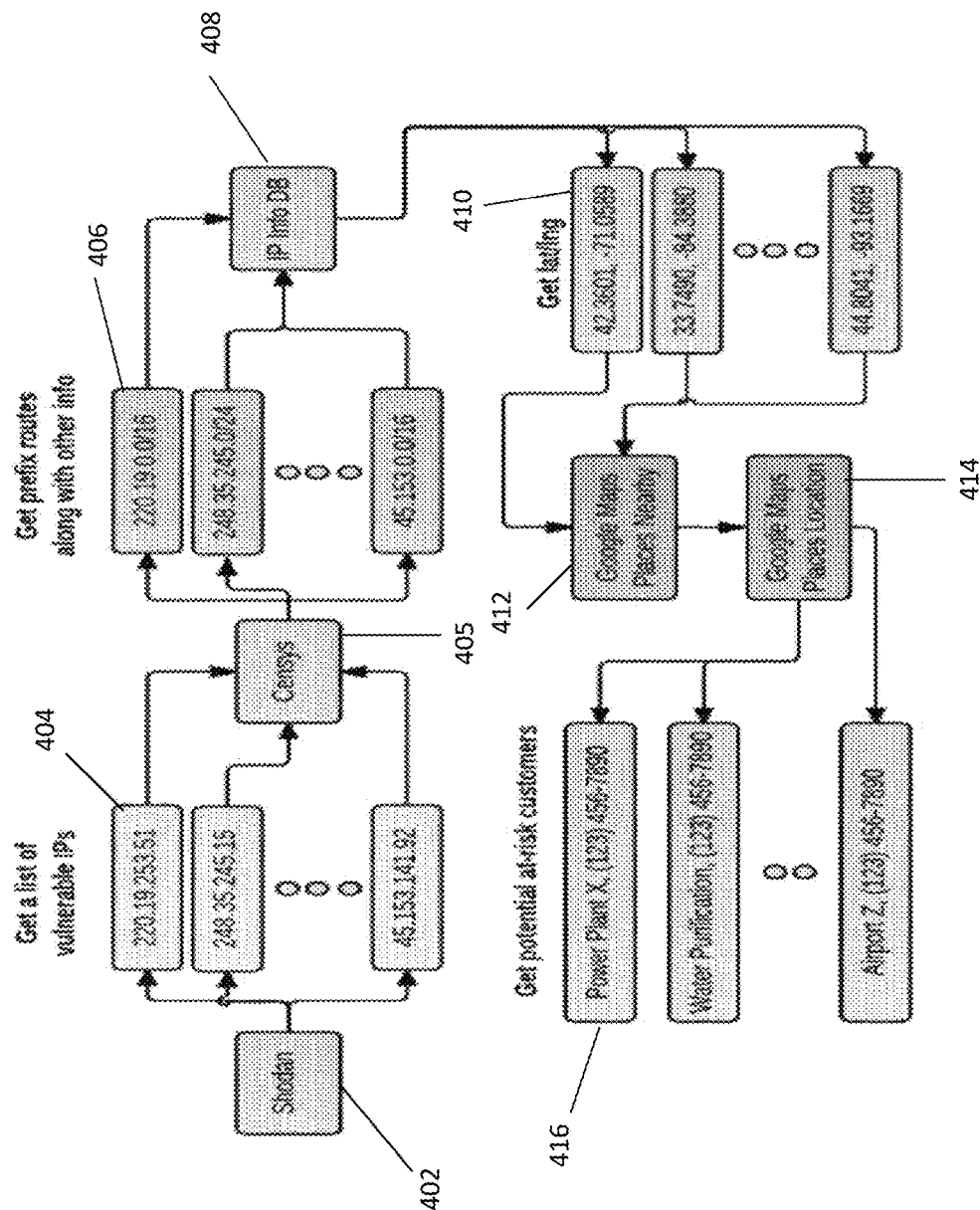
FIG. 4 is a block diagram illustrating the flow of data in the system for detecting and locating unsecured sensors in a network in accordance with an exemplary embodiment.

FIG. 4 is a block diagram illustrating the flow of data in the system for detecting and locating unsecured sensors in a network in accordance with an exemplary embodiment. The system for detecting unsecured sensors in a network can be automated using an automated pipeline. The automated pipeline can be implemented in one or more programming or scripting languages. As a non-limiting example, the automation pipeline can be implemented in Python. The functions and utilities can be included in a github repo and file automation.py.

As a non-limiting example, the computing system (e.g., computing system 150 as shown in FIGS. 1 and 3) can interface with an external domain such as, Shodan 402, using a shodan-api (e.g., via API 322 as shown in FIG. 3), to retrieve a list of potentially unsecured/vulnerable IP addresses 404 associated with IoT sensors. An exemplary output file from Shodan is illustrated in FIG. 5A. The shodan output file can include a list of IP addresses 502 and additional information associated with the IP addresses 504. Any location information that may be available for the IP addresses in the additional information associated with the IP addresses 504, cannot be relied upon as such location information has been found to be inaccurate.

Turning back to FIG. 4, the computing system can interface with another external domain such as, Censys 405, using a censys-api (e.g., via API 322 as shown in FIG. 3). The computing system can retrieve a prefix route 406 for each of the IP Addresses 404, from Censys 405. An exemplary output file from Censys is illustrated in FIGS. 5B-5G.

Referring again to FIG. 4, the computing system can interface with another external domain such as, IP Info DB 408 using ipnfodb-geolocation (e.g., via API 322 as shown in FIG. 3) to retrieve a longitude and latitude value 410 for each of the IP addresses 404, using the prefix routes 406 for each of the IP addresses 404. The longitude and latitude values 410 can be locations of potentially unsecured/vulnerable sensors. An exemplary output file from IP InfoDB is illustrated in FIG. 5H. The IP InfoDB output file can include the longitude and latitude values associated with each of the IP addresses.

Turning back to FIG. 4, the computing system can interface with another external domain such as, Google Maps 412 to retrieve facilities (where the sensors may be disposed) nearby each of the longitude and latitude values 410. The computing system can also interface with Google Maps 416 to retrieve the location of the facilities within a specified proximity to the longitude and latitude values 410. The computing system generates a list of facilities 416 which are potentially at risk due to unsecured/vulnerable sensors as determined by the analysis as described in relation to 402, 405, 408, 412 and 414. In response to interfacing with Google Maps, a Google Maps API output file, as illustrated in FIG. 5I, is generated. The Google Maps API output file can include locations of the facilities within a specified proximity to the longitude and latitude values associated with each of the IP addresses. A graphical user interface (e.g., graphical user interface 200 as shown in FIGS. 2A-2C and 3) can render locations of the facilities from the Google Maps API output file, as data points (e.g., data points 215 as shown in FIGS. 2A-2C) on a geographic map (e.g., geographic map 210 as shown in FIGS. 2A-2C).

In one embodiment, the output from Google Maps API can provide information associated with entities (e.g., name, phones, locations). These entities can be cross-referenced with services such as, TRIT or PermID® (PermID.org), that can identify a PermID® for the entity. The PermID® can be utilized in ascertaining a third party risk, compliance and/or reputational risk.

Figure 6:
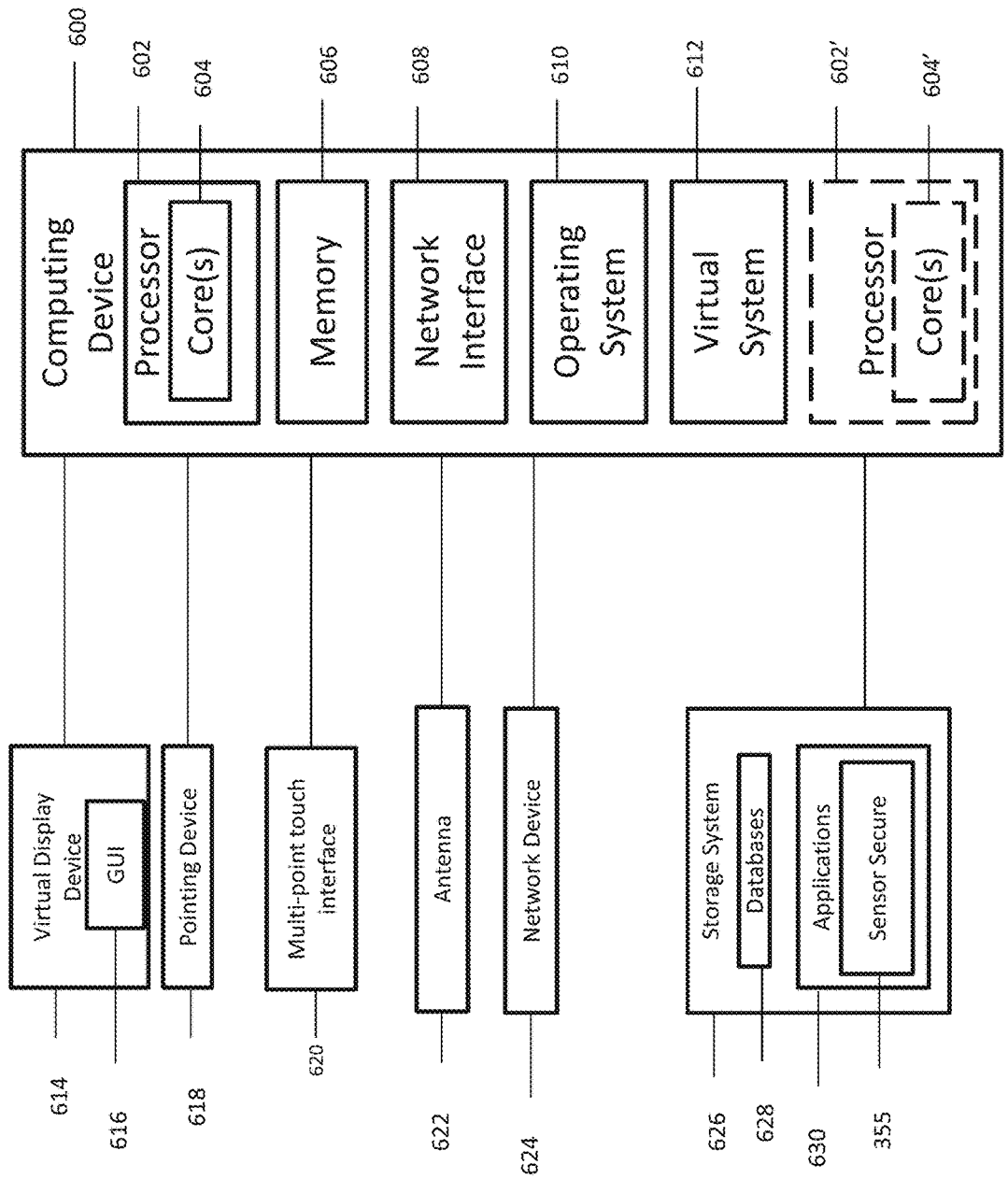
FIG. 6 illustrates a computing device in accordance with an exemplary embodiment.

FIG. 6 is a block diagram of an example computing device for implementing exemplary embodiments. The computing device 600 may be, but is not limited to, a smartphone, laptop, tablet, desktop computer, server or network appliance. The computing device 600 can be embodied as part of the computing system, user device and/or external domain. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 606 included in the computing device 600 may store computer-readable and computer-executable instructions or software (e.g., applications 630 such as the sensor secure 355) for implementing exemplary operations of the computing device 600. The computing device 600 also includes configurable and/or programmable processor 602 and associated core(s) 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for implementing exemplary embodiments. Processor 602 and processor(s) 602' may each be a single core processor or multiple core (604 and 604') processor. Either or both of processor 602 and processor(s) 602' may be configured to execute one or more of the instructions described in connection with computing device 600.

Virtualization may be employed in the computing device 600 so that infrastructure and resources in the computing device 600 may be shared dynamically. A virtual machine 612 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing device 600 through a visual display device 614, such as a computer monitor, which may display one or more graphical user interfaces 616, multi touch interface 620, and a pointing device 618.

The computing device 600 may also include one or more storage devices 626, such as a hard-drive, CD-ROM, or other computer readable media, for storing data and computer-readable instructions and/or software that implement exemplary embodiments (e.g., applications i.e. the sensor secure 355). For example, exemplary storage device 626 can include one or more databases 628 for storing information regarding facilities and sensors. The databases 628 may be updated manually or automatically at any suitable time to add, delete, and/or update one or more data items in the databases.

The computing device 600 can include a network interface 608 configured to interface via one or more network devices 624 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 622 to facilitate wireless communication (e.g., via the network interface) between the computing device 600 and a network and/or between the computing device 600 and other computing devices. The network interface 608 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

The computing device 600 may run operating system 610, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 600 and performing the operations described herein. In exemplary embodiments, the operating system 610 may be run in native mode or emulated mode. In an exemplary embodiment, the operating system 610 may be run on one or more cloud machine instances.

Figure 7:
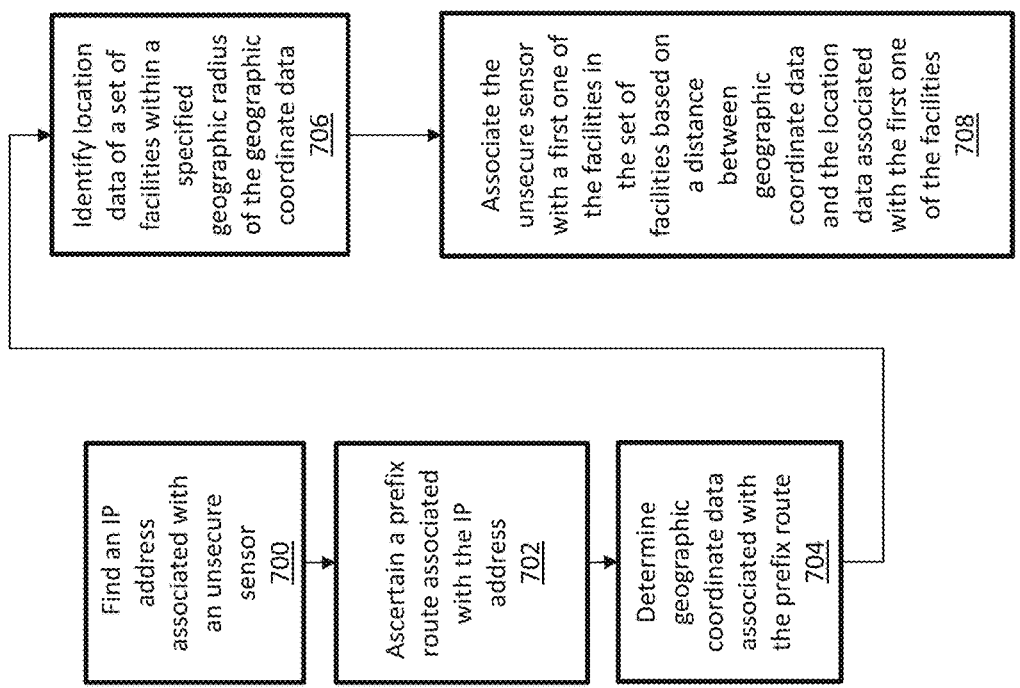
FIG. 7 is a flowchart illustrating an exemplary process performed in a system for detecting and locating unsecured sensors in a network according to an exemplary embodiment.

FIG. 7 is a flowchart illustrating an exemplary process performed in a system for detecting unsecured sensors in a network. In operation 700, a computing system (e.g., computing system 150 as shown in FIGS. 1 and 3) can find an IP address (e.g., IP address 404 as shown in FIG. 4) associated with an unsecured sensor (e.g., sensor 120A-N as shown in FIGS. 1 and 3) based on a port through which the unsecured sensor communicates with the network. In operation 702, the computing system can ascertain a prefix route (e.g., prefix route 406 as shown in FIG. 4) associated with the IP address for the unsecured sensor based on a portion of the IP address. In operation 704, the computing system can determine geographic coordinate data (longitude and latitude values 410 as shown in FIG. 4) associated with the prefix route. In operation 706, the computing system can identify location data of a set of facilities (e.g. list of facilities 416 as shown in FIG. 4) within a specified geographic radius of the geographic coordinate data.

In operation 708, the computing system can associate the unsecured sensor with a first one of the facilities in the set of facilities based on a distance between geographic coordinate data and the location data associated with the first one of the facilities being less than a specified distance threshold. The computing system can also generate a confidence score for the identified locations and entities as they relate to the detected sensors, which can be used to identify which locations and/or entities are more likely to correspond to the sensors and which locations and/or entities are less likely to correspond to the sensors. Additionally, the computing system can interface with services such as Thomson Reuters® services TRIT or PermID® (PermID.org), to determine additional information associated with the identified sensor and/or entity, which can be used to enhance the results and provide a mechanism for resolving the security risks posed by the sensors.

Figure 8:
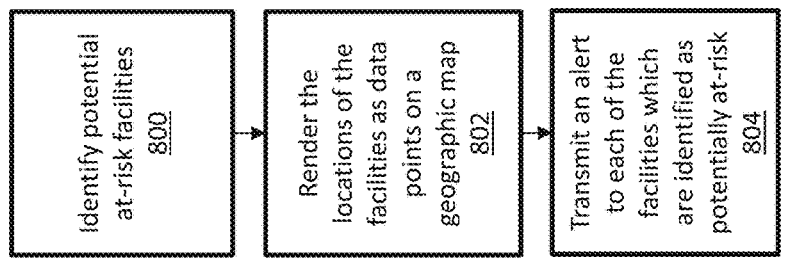
FIG. 8 is a flowchart illustrating an exemplary process performed in an embodiment of the system for detecting and locating unsecured sensors in a network.

FIG. 8 is a flowchart illustrating an exemplary process performed in a system for detecting unsecured sensors in a network. In operation 800, the computing system (e.g., computing system 150 as shown in FIGS. 1 and 3) can identify potential at-risk facilities (e.g., list of at-risk facilities 416 as shown in FIG. 4) based on detected and located unsecured/vulnerable sensors (e.g. sensors 120A-N as shown in FIGS. 1 and 3). In operation 802, the computing system can render the locations of the facilities as data points (e.g. data points 215 as shown in FIGS. 2A-2C) on a geographic map (e.g. geographic map as shown in FIGS. 2A-cC) on a graphical user interface (e.g. graphical user interface 200 as shown in FIGS. 2A-2C and 3). In operation 804, the computing system can transmit an alert to each entity associated with the facilities which are identified as potentially at-risk due to the detection of unsecured sensors. In some embodiments, the computing system can ping the unsecured sensors on behalf of the entities to determine additional attributes of the unsecured sensors, such as media access control (MAC) addresses, firmware information, device that are connected to the unsecured sensors, and the like, which can be used to secure the unsecured sensors.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for detecting and locating unsecured sensors in a network, the system comprising:
   a non-transitory computer-readable medium storing a detection and alerting application;

a computing system in communication with a network, the computing system including one or more computing devices, the computing system configured to:
   find an IP address associated with an unsecured sensor based on a port through which the unsecured sensor communicates with the network;
   ascertain a prefix route associated with the IP address for the unsecured sensor based on a portion of the IP address;
   determine geographic coordinate data associated with the prefix route;
   identify location data of a set of facilities within a specified geographic radius of the geographic coordinate data; and
   associate the unsecured sensor with a first facility in the set of facilities in response to determining a distance between geographic coordinate data and the location data associated with the first facility is less than a specified distance threshold and determining that the first facility includes a type of sensor that corresponds to the unsecured sensor.

2. The system of claim 1, wherein the geographic coordinate data is longitude and latitude data.

3. The system of claim 1, wherein the unsecured sensor is an Internet of Things (IoT) device configured to transmit and receive data associated with an operation of a device in the first facility.

4. The system of claim 3, wherein the computing system is configured to transmit an alert to the first facility in response to associating the unsecured sensor with the first facility.

5. The system of claim 3, wherein the computing system includes a graphical user interface (GUI).

6. The system of claim 5, wherein the GUI is configured to render a geographic map on which the geographic coordinate data of the IP address and the location data of the set of facilities is overlaid.

7. The system of claim 6, wherein the GUI is configured to render information associated with the set of facilities within the specified geographic radius of the geographic coordinate data.

8. The system of claim 7, wherein the computing system receives input from the GUI indicating a type of sensor from which the port is derived.

9. The system of claim 1, wherein the computing system finds an IP address associated with the unsecured sensor based on a port through which the unsecured sensor communicates with the network, a name of a manufacturer of the unsecured sensor, and a geographic region within which the unsecured sensor resides.

10. The system of claim 9, wherein the computing system interfaces with a plurality of external systems to find the IP address associated with the unsecured sensor, the name of the manufacturer of the unsecured sensor and the geographic and the geographic region within which the unsecured sensor is located.

11. A method for detecting and locating unsecured sensors in a network, the method comprising:
   finding, via a computing system in communication with a network, an IP address associated with an unsecured sensor based on a port through which the unsecured sensor communicates with the network;
   ascertaining, via the computing system, a prefix route associated with the IP address for the unsecured sensor based on a portion of the IP address;
   determining, via the computing system, geographic coordinate data associated with the prefix route;
   identifying, via the computing system, location data of a set of facilities within a specified geographic radius of the geographic coordinate data; and
   associating, via the computing system, the unsecured sensor with a first facility in the set of facilities in response to determining a distance between geographic coordinate data and the location data associated with the first facility is less than a specified distance threshold and determining that the first facility includes a type of sensor that corresponds to the unsecured sensor.

12. The method of claim 11, wherein the geographic coordinate data is longitude and latitude data.

13. The method of claim 11, wherein the unsecured sensor is an Internet of Things (IoT) device configured to transmit and receive data associated with an operation of a device in the first facility.

14. The method of claim 13, further comprising transmitting, via the computing system, an alert to the first one of the facilities in response to associating the unsecured sensor with the first facility.

15. The method of claim 13, wherein the computing system includes a graphical user interface (GUI).

16. The method of claim 15, further comprising rendering, via the GUI, a geographic map on which the geographic coordinate data of the IP address and the location data of the set of facilities is overlaid.

17. The method of claim 16, further comprising rendering, via the GUI, information associated with the set of facilities within the specified geographic radius of the geographic coordinate data.

18. The method of claim 17, further comprising receiving, via the computing system, input from the GUI indicating a type of sensor from which the port is derived.

19. The method of claim 11, further comprising finding, via the computing system, an IP address associated with the unsecured sensor based on a port through which the unsecured sensor communicates with the network, a name of a manufacturer of the unsecured sensor, and a geographic region within which the unsecured sensor resides.

20. The method of claim 19, further comprising interfacing, via the computing system, with a plurality of external systems to find the IP address associated with the unsecured sensor, the name of the manufacturer of the unsecured sensor and the geographic and the geographic region within which the unsecured sensor is located.

* * * * *